INVENTORS
EMANUEL L. BRANCATO
ARTHUR T. MC. CLINTON

BY ATTORNEYS

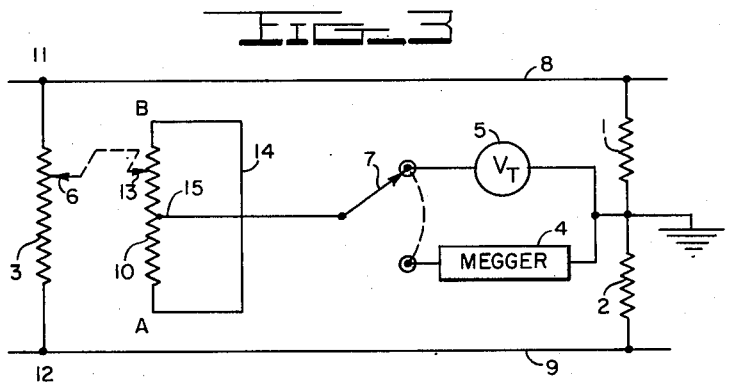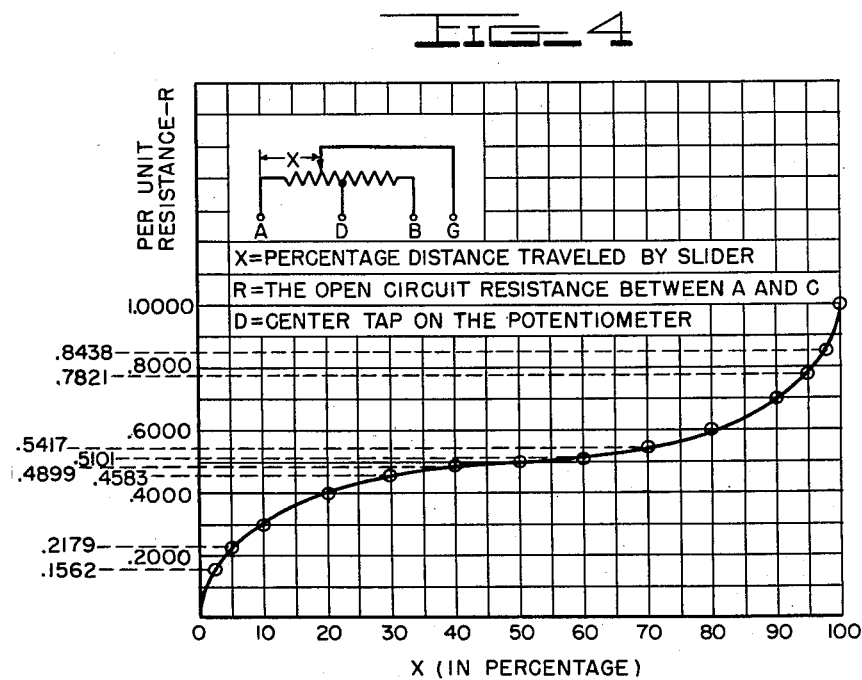

Patented Mar. 17, 1953

2,632,037

UNITED STATES PATENT OFFICE 2,632,037

GROUND DETECTOR

Emanuel L. Brancato, Riverdale, Md., and Arthur T. McClinton, Alexandria, Va.

Application October 4, 1950, Serial No. 188,458

14 Claims. (Cl. 175—183)

(Granted under Title 35, U. S. Code (1952), sec. 266)

This invention relates to a method and apparatus for measuring the insulation resistance of an energized voltage system.

The two basic prior art methods of measuring insulation resistance are the so-called "voltmeter method" wherein several separate measurements must be taken and then a calculation made, and the ohmmeter method which requires a de-energized system.

The "voltmeter method" is not too convenient a system from the standpoint of ease and speed of measurement. What is most important, it is subject to considerable inaccuracy at large values of insulation resistance and requires an energized system of constant potential.

The ohmmeter method is often unsatisfactory because it requires a de-energized system. For many applications it is not convenient to interrupt the energization of the system to measure the insulation resistance.

The present invention affords accurate and quick measurement of insulation resistance with either energized or de-energized systems subject to wide fluctuation of voltage.

One object of the present invention is therefore to provide a method and apparatus for measuring insulation resistance in an energized as well as a de-energized voltage system.

Another object of the present invention is to provide a quick and accurate method of measuring insulation resistance in an energized voltage system where the voltage is subject to fluctuation over wide limits.

These and other objects of the present invention will become apparent from the specifications and attached drawings wherein:

Figure 3 is an improved embodiment of that shown in Figure 1.

Figure 4 is a curve showing the design of compensating potentiometer 10.

Basically the present invention consists of the method and apparatus for balancing out the voltage of the system, and then measuring the net resistance of the circuit to ground by means of a conventional ohmmeter.

Figure 1:
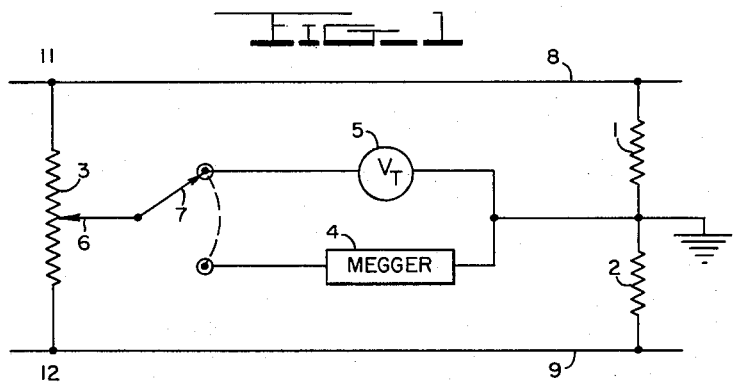
Figure 1 shows one embodiment of the apparatus of the present invention.

Referring now to the embodiment of Figure 1, the object of the present invention is to measure the insulation resistance between lines 8 and 9 to ground while the system is energized.

A potentiometer 3 is placed across lines 8 and 9 and the movable contact 6 is first connected to a voltmeter 5 whose other terminal is grounded. The insulation resistance designated 1 between conductor 8 and ground, and that between conductor 9 and ground form a voltage divider. Thus the movable contact 6 of potentiometer 3 can be moved to a point where voltmeter reads zero. Potentiometer 3 is thus a balancing potentiometer.

Once a balance is obtained, any voltage fluctuation in lines 8—9 will not disturb the zero reading of voltmeter 5.

Moving switch contact 7 to ohmmeter 4 places the ohmmeter in the system which then measures a resistance:

(1) $$R = \frac{(R_1 + R_{6-11})(R_2 + R_{6-12})}{R_1 + R_2 + R_3}$$

where $R_1$, $R_2$ and $R_3$ represent resistances 1, 2 and 3 respectively.

$R_{6-11}$ represents the portion of resistance 3 between movable contact 6 and point 11.

$R_{6-12}$ represents the portion of resistance 3 between contact 6 and point 12.

The insulation resistance which it is desired to measure is the net insulation resistance between the system of lines 8—9 to ground. This resistance is the net insulation resistance of $R_1$ and $R_2$ in parallel circuit relation.

From Equation 1 it is clear that the ohmmeter measurement does not give this insulation resistance directly but contains the resistance of potentiometer 3 as a factor. It was discovered that the error in the measurement of the insulation resistance by the reading of ohmmeter 4 caused by resistance 3 is completely independent of the value of the insulation resistance measured. This error resistance can be calculated by the following equation:

(2) $$\text{Error} = \frac{(R_{6-11})(R_{6-12})}{R_3}$$

The insulation resistance is obtained by subtracting the results of error Equation 2 from Equation 1 which represents the ohmmeter measurement.

Figure 2:
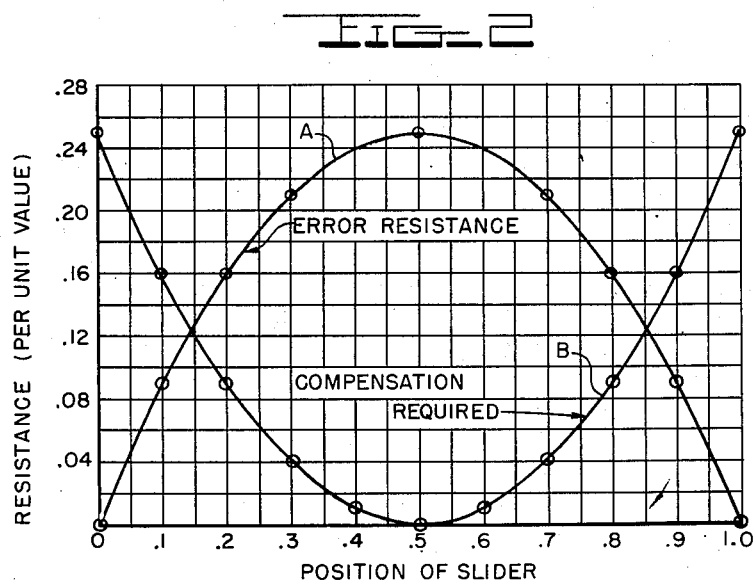
Figure 2 shows graphically the resistance error and correction curves pertaining to the potentiometers utilized in the apparatus forming the present invention.

Curve A in Figure 2 is a curve of this equation wherein the abscissa represents 10 equally spaced positions on the balancing potentiometer 3 engaged by slider or contact 3. The extreme positions 0 and 1 represent the extreme positions 11 and 12 respectively on the potentiometer 3.

One way to quickly measure the insulation resistance is to use the error curve A of Figure 2 to correct the ohmmeter reading.

Curve B is a curve showing the resistance required to be added in series with the ohmmeter 4 for the various balancing potentiometer positions to give a constant error over the entire range of balancing potentiometer positions. It is to be noted that the sum of these two curves A+B is made equal to a constant value which in the example shown is .25 ohms per ohm of balancing potentiometer 3. If a variable compensation resistance were added in series to ohmmeter 4 which is made to vary in value as the contact 6 of balancing potentiometer 3 is moved so as to have the resistance variation of curve B, a greatly simplified measuring system results where the ohmmeter 4 gives a constant error irrespective of the position of balancing potentiometer 3 and irrespective of the value of the insulation resistance.

The improved embodiment of Figure 3 incorporates such a compensation resistance 10. The compensation resistance comprises a combination voltage divider and potentiometer 10 the extreme ends of which have been shorted together as by conductor 14. A fixed connection is made between the center tap 15 on resistance 10 to switch contact 7 which is in series with ohmmeter 4 when the insulation resistance is measured. Sliding contact 13 of potentiometer 10 is ganged to, and is in series circuit relation with, the sliding contact 6 of balancing potentiometer 3.

It should be apparent that since the compensation curve B of Figure 2 is not a straight line, and since the value of compensation resistance 10 added in series with ohmmeter 4 is made up of the parallel resistance paths of sliding contact 13 directly to center tap 15, and from sliding contact 13 to center tap 15 by means of shorting conduction 14, resistance 10 must be non-linearly wound to satisfy the requirements of curve B of Figure 2.

Figure 4 shows a curve of the design of compensating potentiometer 10 where the abscissa represents the physical distance X from one end of potentiometer 10 to the sliding contact 13 given in percentage of the total length of potentiometer 10. The ordinate gives the per unit resistance between one end A of resistance 10 to the sliding contact 13 when the end A and B are not shorted together. The design of Figure 4 of course assumes that balancing potentiometer 3 is linearly wound.

The improved embodiment of Figure 3 results in a simple and quick method of measuring the insulation resistance of an energized electrical system.

The method of measurement using the embodiment of Figure 3 is as follows: Switch 7 is placed on the upper contact to connect voltmeter 5 into the circuit and the slider 6 of balancing potentiometer 3 is moved until voltmeter 5 (which is then coupled between ground and the movable contact 6 of balancing potentiometer 3) reads zero voltage. Then switch 7 is moved to the lower contact where ohmmeter 3 is in the circuit. From the reading of ohmmeter 4 is subtracted the constant error resistance. If the ohmmeter scale is calibrated for this fixed error resistance, then the ohmmeter reading will give the insulation resistance directly.

Although the present invention has been applied to the measurement of insulation resistance, it also has application to measuring the net impedance including capacitance or inductance, between the energized system and ground or other reference point. In such case ohmmeter 4 is replaced by an impedance measuring instrument such as Wheatstone bridge or the like. In such case, the same constant resistance error due to resistances 3 and 10 must of course be taken into account.

It is to be noted that the impedance or resistance measuring instrument has its own voltage source which is not effected by the system voltage because balancing potentiometer 3 is used to balance out the system voltage. This system voltage could be an alternating or a direct current voltage.

Reactance measuring devices usually operate from an alternating current so that for reactance measurement the reactance of resistances 3 and 10 should be made negligible.

Numerous modifications may be made of the exemplary embodiments shown without deviating from the scope of the present invention.

The invention described herein may be manufactured and used by or for the Government of the United States of America for governmental purposes without the payment of any royalties thereon or therefor.

What is claimed is:

1. A method of measuring the electrical impedance between the conductors of an energized electrical system and a reference point comprising the steps of connecting a potentiometer having a known impedance between said conductors, adjusting said potentiometer to locate the point thereon having the same potential as said reference point, and connecting an electrical impedance measuring device between said point on said potentiometer and said reference point.

2. A method of measuring the electrical impedance between the conductors of an energized electrical system and a reference point comprising the steps of balancing out the system voltage existing between a point common to the said conductors and said reference point, and connecting an electrical impedance measuring device between said two points.

3. Apparatus for measuring the electrical impedance between the conductors of an energized electrical system and a reference point comprising the combination of means coupled between said conductors for balancing out the system voltage existing between a point common to the said conductors and said reference point, voltmeter means, electrical impedance measuring means, switch means separately coupling one terminal of said voltmeter means and said electrical impedance measuring means to said common point, means connecting the other terminal point of said voltmeter means and impedance measuring means to said reference point.

4. Apparatus for measuring the electrical impedance between the conductors of an energized electrical system and a reference point comprising the combination of means coupled between said conductors for balancing out the system voltage existing between a point common to the said conductors and said reference point, electrical impedance measuring means coupled between said common point and said reference point.

5. A method of measuring the insulation impedance between two conductors of an energized electrical system and a point from which said system is insulated comprising the steps of connecting a known resistance potentiometer between said conductors, coupling a voltage measuring device between said point from which the system is to be insulated and the movable contact of said potentiometer, adjusting the position of said movable contact until said voltage measuring device registers zero voltage, and connecting an electrical impedance measuring device between said movable potentiometer contact and said point.

6. A method of measuring the insulation resistance between two conductors of an energized electrical system and a point from which said system is insulated comprising the steps of connecting a known resistance potentiometer between said conductors, coupling a voltage measuring device between said point from which the system is to be insulated and the movable contact of said potentiometer, adjusting the position of said movable contact until said voltage measuring device registers zero voltage, and connecting a resistance measuring device between said movable potentiometer contact and said point.

7. Apparatus for measuring the insulation resistance between two conductors of an energized electrical system and a reference point from which said system is to be insulated comprising the combination of a resistance potentiometer coupled between said conductors for balancing out the voltage between its movable contact and said point, voltage measuring means, resistance measuring means, switch means for separately coupling one terminal of said voltage measuring means and said resistance measuring means to the movable contact of said potentiometer, and means connecting the other terminal point of said voltage measuring means and resistance measuring means to said reference point.

8. Apparatus for measuring the insulation resistance between two conductors of an energized electrical system and a reference point from which said system is to be insulated comprising the combination of, a resistance potentiometer coupled between said conductors for balancing out the voltage between its movable contact and said point, voltage measuring means, switch means for separately connecting two series circuits between the movable contact of said potentiometer and said point, one series circuit including a voltage measuring device for indicating when the voltage between the movable contact and said point is zero, the other series circuit including a resistance measuring means and a variable compensating resistance in series with said resistance measuring means ganged to the movable contact of said potentiometer so that the error in the resistance measuring means due to the resistance of said potentiometer is constant irrespective of the position of the movable contact of said potentiometer.

9. Apparatus for measuring the insulation resistance between two conductors of an energized electrical system and a reference point from which said system is to be insulated comprising the combination of, a resistance potentiometer coupled between said conductors for balancing out the voltage between its movable contact and said point, voltage measuring means, switch means for separately connecting two series circuits between the movable contact of said potentiometer and said point, one series circuit including a voltage measuring device for indicating when the voltage between the movable contact and said point is zero, the other series circuit including a non-linearly wound compensating resistance and a resistance measuring means, said compensating resistance having a movable contact and a fixed center tap contact, the outer terminals of said compensating resistance being shorted together, mechanical means coupled between the movable contacts of said compensating resistance and said potentiometer whereby movement of one contact moves the other contact a corresponding amount, a resistance measuring means, the movable contact of said potentiometer and one terminal of said resistance measuring means each coupled to a different one of said contacts of said compensating resistance, the non-linearity of the winding of said compensating resistance being such that the sum of the resistance between its fixed and movable contacts plus the error in the resistance measuring means introduced by the resistance of the potentiometer is constant irrespective of the position of the movable contact of said potentiometer.

10. Apparatus for measuring the insulation resistance between two conductors of an energized electrical system and a reference point from which said system is to be insulated comprising the combination of a resistance potentiometer coupled between said conductors for balancing out the voltage between its movable contact and said point, a series circuit coupled between the movable contact of said potentiometer and said reference point comprising a switch means, a compensating resistance and a resistance measuring means, said compensating resistance having a movable contact and a fixed center tap contact, the outer terminals of said compensating resistance being shorted together, mechanical means coupled between the movable contacts of said compensating resistance and said potentiometer whereby movement of one contact moves the other contact a corresponding amount, a resistance measuring means, the movable contact of said potentiometer and one terminal of said resistance measuring device each coupled to a different one of said contacts of said compensating resistance, the non-linearity of the winding of said compensating resistance being such that the sum of the resistance between its fixed and movable contacts plus the error in the resistance measuring means introduced by the resistance of the potentiometer is constant irrespective of the position of the movable contact of said potentiometer.

11. A method of measuring the electrical impedance between the conductors of an energized electrical system and a reference point which is not normally a point on said conductors comprising the steps of balancing out the system voltage existing between a point common to the said conductors and said reference point, and connecting an electrical impedance measuring device between said two points.

12. Apparatus for measuring the impedance between the conductors of an energized electrical system and a reference point which is not normally a point on said conductors comprising the combination of means for balancing out the system voltage existing between a point common to said conductors and said reference point, and means coupled between said common and reference points for measuring the impedance therebetween.

13. A method of measuring an electrical impedance in an energized system comprising the steps of balancing out the system voltage across two points across which the impedance is to be measured, and connecting an electrical impedance measuring device between said two points.

14. Apparatus for measuring the electrical impedance between two points in an energized electrical system comprising the combination of means for balancing out the voltage between said two points, means coupled between said two points for measuring the electrical impedance therebetween.

EMANUEL L. BRANCATO.
ARTHUR T. McCLINTON.

REFERENCES CITED

The following references are of record in the file of this patent:

UNITED STATES PATENTS

| Number | Name | Date |
| --- | --- | --- |
| 2,008,857 | Flanders | July 23, 1935 |
| 2,578,455 | Seely | Dec. 11, 1951 |